US012398224B2

United States Patent
Wang et al.

(10) Patent No.: US 12,398,224 B2
(45) Date of Patent: Aug. 26, 2025

(54) BLOWN FILM

(71) Applicant: Borealis AG, Vienna (AT)

(72) Inventors: Jingbo Wang, Linz (AT); Markus Gahleitner, Linz (AT); Klaus Bernreitner, Linz (AT); Pauli Leskinen, Porvoo (FI); Peter Niedersuess, Linz (AT); Stefan Ortner, Linz (AT)

(73) Assignee: Borealis AG, Vienna (AT)

(*) Notice: Subject to any disclaimer, the term of this patent is extended or adjusted under 35 U.S.C. 154(b) by 510 days.

(21) Appl. No.: 17/995,997

(22) PCT Filed: Apr. 9, 2021

(86) PCT No.: PCT/EP2021/059256
§ 371 (c)(1),
(2) Date: Oct. 12, 2022

(87) PCT Pub. No.: WO2021/209326
PCT Pub. Date: Oct. 21, 2021

(65) Prior Publication Data
US 2023/0212338 A1 Jul. 6, 2023

(30) Foreign Application Priority Data
Apr. 17, 2020 (EP) .................... 20170112

(51) Int. Cl.
C08F 210/06 (2006.01)
C08F 2/00 (2006.01)
C08J 5/18 (2006.01)

(52) U.S. Cl.
CPC ............ *C08F 210/06* (2013.01); *C08F 2/001* (2013.01); *C08J 5/18* (2013.01); *C08J 2323/14* (2013.01)

(58) Field of Classification Search
CPC ..... C08J 5/18; C08F 2500/12; C08F 2500/35; C08L 23/142
See application file for complete search history.

(56) References Cited

U.S. PATENT DOCUMENTS

| | | | |
|---|---|---|---|
| 9,637,602 B2 | 5/2017 | Potter et al. |
| 9,670,293 B2 | 6/2017 | Reznichenko et al. |
| 9,670,347 B2 | 6/2017 | Töltsch et al. |
| 9,708,481 B2 | 7/2017 | Wang et al. |
| 9,745,431 B2 | 8/2017 | Potter et al. |
| 9,751,962 B2 | 9/2017 | Wang et al. |
| 9,777,142 B2 | 10/2017 | Sandholzer et al. |
| 9,802,394 B2 | 10/2017 | Cavacas et al. |
| 9,828,698 B2 | 11/2017 | Wang et al. |
| 9,890,275 B2 | 2/2018 | Sandholzer et al. |
| 9,976,020 B2 | 5/2018 | Nummila-Pakarinen et al. |
| 10,011,708 B2 | 7/2018 | Lampela et al. |
| 10,030,109 B2 | 7/2018 | Boragno et al. |
| 10,040,930 B2 | 8/2018 | Gloger et al. |
| 10,100,185 B2 | 10/2018 | Wang et al. |
| 10,100,186 B2 | 10/2018 | Wang et al. |
| 10,227,427 B2 | 3/2019 | Reichelt et al. |
| 10,450,451 B2 | 10/2019 | Wang et al. |
| 10,519,259 B2 | 12/2019 | Resconi et al. |
| 10,870,718 B2 | 12/2020 | Denifl et al. |
| 11,292,900 B2 | 4/2022 | Gahleitner et al. |
| 11,299,617 B2 | 4/2022 | Prieto et al. |
| 11,390,732 B2 | 7/2022 | Van Houcke et al. |
| 11,492,478 B2 | 11/2022 | Kniesel et al. |
| 11,504,949 B2 | 11/2022 | Oderkerk et al. |
| 11,518,863 B2 | 12/2022 | Vijay |
| 11,530,321 B2 | 12/2022 | Kniesel et al. |
| 2011/0129627 A1 | 6/2011 | Schedenig et al. |
| 2016/0185946 A1 | 6/2016 | Sandholzer et al. |
| 2016/0194486 A1 | 7/2016 | Sandholzer et al. |
| 2016/0200838 A1 | 7/2016 | Reznichenko et al. |
| 2016/0208085 A1 | 7/2016 | Gloger et al. |
| 2016/0229158 A1 | 8/2016 | Cavacas et al. |
| 2016/0237270 A1 | 8/2016 | Wang et al. |
| 2016/0244539 A1 | 8/2016 | Resconi et al. |
| 2016/0272740 A1 | 9/2016 | Wang et al. |
| 2016/0280899 A1 | 9/2016 | Töltsch et al. |
| 2016/0304681 A1 | 10/2016 | Potter et al. |
| 2016/0311951 A1 | 10/2016 | Reichelt et al. |
| 2016/0311988 A1 | 10/2016 | Potter et al. |
| 2016/0312018 A1 | 10/2016 | Vestberg et al. |
| 2016/0312019 A1 | 10/2016 | Lampela et al. |
| 2016/0347943 A1 | 12/2016 | Wang et al. |
| 2016/0347944 A1 | 12/2016 | Wang et al. |
| 2017/0009068 A1 | 1/2017 | Kahlen et al. |

(Continued)

FOREIGN PATENT DOCUMENTS

| | | |
|---|---|---|
| CN | 104159965 A | 11/2014 |
| CN | 104169355 A | 11/2014 |

(Continued)

OTHER PUBLICATIONS

Bychuk, M.A., "Preparation and Properties of Polymer Films based on Poly-3-hydroxbutyrate and Polycaprolactone." Ph.D. Thesis, pp. 5-6 (2016).
Federal Institute of Industrial Property, Office Action issued in Russian Patent Application No. 2022129451/04(064513) (Mar. 31, 2023).
U.S. Appl. No. 14/914,501, filed Feb. 25, 2016.
U.S. Appl. No. 14/911,295, filed Feb. 10, 2016.
U.S. Appl. No. 14/911,300, filed Feb. 10, 2016.
U.S. Appl. No. 14/911,299, filed Feb. 10, 2016.
U.S. Appl. No. 15/022,671, filed Mar. 17, 2016.
U.S. Appl. No. 15/030,556, filed Apr. 19, 2016.
U.S. Appl. No. 15/022,664, filed Mar. 17, 2016.
U.S. Appl. No. 15/029,493, filed Apr. 14, 2016.
U.S. Appl. No. 15/027,129, filed Apr. 4, 2016.
U.S. Appl. No. 15/101,837, filed Jun. 3, 2016.

(Continued)

Primary Examiner — Christopher M Rodd
(74) Attorney, Agent, or Firm — Leydig, Voit & Mayer, Ltd.

(57) ABSTRACT

Blown films, especially monolayer blown films, with an improved property profile, the blown films comprising at least 95.0 wt % of a specific heterophasic propylene copolymer (TERHECO).

18 Claims, No Drawings

(56) References Cited

U.S. PATENT DOCUMENTS

| | | |
|---|---|---|
| 2017/0029980 A1 | 2/2017 | Wang et al. |
| 2017/0137617 A1 | 5/2017 | Wang et al. |
| 2017/0166711 A1 | 6/2017 | Boragno et al. |
| 2017/0218172 A1 | 8/2017 | Wang et al. |
| 2017/0313867 A1 | 11/2017 | Lampela et al. |
| 2017/0321048 A1 | 11/2017 | Nummila-Pakarinen et al. |
| 2018/0079875 A1 | 3/2018 | Braun et al. |
| 2018/0194881 A1 | 7/2018 | Denifl et al. |
| 2020/0263015 A1 | 8/2020 | Kniesel et al. |
| 2020/0270434 A1 | 8/2020 | Van Houcke et al. |
| 2020/0277479 A1 | 9/2020 | Jerabek et al. |
| 2020/0308353 A1 | 10/2020 | Jerabek et al. |
| 2020/0347216 A1 | 11/2020 | Kniesel et al. |
| 2020/0392321 A1 | 12/2020 | Gahleitner et al. |
| 2021/0114352 A1 | 4/2021 | Oderkerk et al. |
| 2021/0171749 A1 | 6/2021 | Kumar et al. |
| 2021/0171750 A1 | 6/2021 | Gahleitner et al. |
| 2021/0214527 A1 | 7/2021 | Gahleitner et al. |
| 2021/0214533 A1 | 7/2021 | Kulshreshtha et al. |
| 2021/0238376 A1 | 8/2021 | Kahlen et al. |
| 2021/0253836 A1 | 8/2021 | Gahleitner et al. |
| 2021/0269560 A1 | 9/2021 | Krallis et al. |
| 2021/0324189 A1 | 10/2021 | Prieto et al. |
| 2021/0332227 A1 | 10/2021 | Wang et al. |
| 2021/0347971 A1 | 11/2021 | Wang et al. |
| 2022/0033631 A1 | 2/2022 | Gloger et al. |
| 2022/0135779 A1 | 5/2022 | Wang et al. |
| 2022/0204719 A1 | 6/2022 | Vijay |
| 2022/0227965 A1 | 7/2022 | Ruemer et al. |
| 2022/0251256 A1 | 8/2022 | Wang et al. |
| 2022/0289955 A1 | 9/2022 | Kahlen et al. |
| 2022/0306844 A1 | 9/2022 | Kahlen et al. |
| 2022/0315716 A1 | 10/2022 | Prieto et al. |
| 2022/0356330 A1 | 11/2022 | Kahlen et al. |
| 2023/0046086 A1 | 2/2023 | Al-Haj Ali et al. |
| 2023/0047329 A1 | 2/2023 | Al-Haj Ali |

FOREIGN PATENT DOCUMENTS

| | | | |
|---|---|---|---|
| CN | 106459276 A | 2/2017 | |
| CN | 107250177 A | 10/2017 | |
| EP | 0 887 379 A1 | 12/1998 | |
| EP | 2 733 175 A1 | 5/2014 | |
| EP | 3 064 548 A1 | 9/2016 | |
| EP | 3 666 804 A1 | 6/2020 | |
| RU | 2 478 668 C2 | 4/2013 | |
| WO | WO 92/12182 A1 | 7/1992 | |
| WO | WO 99/24478 A1 | 5/1999 | |
| WO | WO 99/24479 A1 | 5/1999 | |
| WO | WO 00/68315 A1 | 11/2000 | |
| WO | WO 02/02576 A1 | 1/2002 | |
| WO | WO 2004/000899 A1 | 12/2003 | |
| WO | WO 2004/111095 A1 | 12/2004 | |
| WO | WO 2007/116034 A1 | 10/2007 | |
| WO | WO 2011/076780 A1 | 6/2011 | |
| WO | WO 2011/135004 A2 | 11/2011 | |
| WO | WO 2012/001052 A2 | 1/2012 | |
| WO | WO 2012/084961 A1 | 6/2012 | |
| WO | WO 2013/007650 A1 | 1/2013 | |
| WO | WO 2013/127760 A1 | 9/2013 | |
| WO | WO-2013127758 A1 * | 9/2013 | ............ C08F 210/06 |
| WO | WO 2015/011135 A1 | 1/2015 | |
| WO | WO 2015/150467 A1 | 10/2015 | |
| WO | WO 2015/158790 A2 | 10/2015 | |
| WO | WO 2016/139163 A1 | 9/2016 | |
| WO | WO 2020/221706 A1 | 11/2020 | |

OTHER PUBLICATIONS

U.S. Appl. No. 15/106,101, filed Jun. 17, 2016.
U.S. Appl. No. 15/103,783, filed Jun. 10, 2016.
U.S. Appl. No. 15/039,107, filed May 25, 2016.
U.S. Appl. No. 15/103,744, filed Jun. 10, 2016.
U.S. Appl. No. 15/102,628, filed Jun. 8, 2016.
U.S. Appl. No. 15/113,907, filed Jul. 25, 2016.
U.S. Appl. No. 15/113,922, filed Jul. 25, 2016.
U.S. Appl. No. 15/113,517, filed Jul. 22, 2016.
U.S. Appl. No. 15/115,929, filed Aug. 2, 2016.
U.S. Appl. No. 15/310,283, filed Nov. 10, 2016.
U.S. Appl. No. 15/514,641, filed Mar. 27, 2017.
U.S. Appl. No. 15/531,974, filed May 31, 2017.
U.S. Appl. No. 15/526,957, filed May 15, 2017.
U.S. Appl. No. 15/566,588, filed Oct. 13, 2017.
U.S. Appl. No. 15/741,861, filed Jan. 4, 2018.
U.S. Appl. No. 16/633,699, filed Jan. 24, 2020.
U.S. Appl. No. 16/761,743, filed May 5, 2020.
U.S. Appl. No. 16/761,757, filed May 5, 2020.
U.S. Appl. No. 16/652,115, filed Mar. 30, 2020.
U.S. Appl. No. 16/763,014, filed May 11, 2020.
U.S. Appl. No. 16/763,001, filed May 11, 2020.
U.S. Appl. No. 16/768,330, filed May 29, 2020.
U.S. Appl. No. 16/982,385, filed Sep. 18, 2020.
U.S. Appl. No. 17/050,550, filed Oct. 26, 2020.
U.S. Appl. No. 17/052,233, filed Nov. 2, 2020.
U.S. Appl. No. 17/047,350, filed Oct. 13, 2020.
U.S. Appl. No. 15/733,971, filed Dec. 1, 2020.
U.S. Appl. No. 17/259,216, filed Jan. 11, 2021.
U.S. Appl. No. 16/973,673, filed Dec. 9, 2020.
U.S. Appl. No. 17/273,687, filed Mar. 4, 2021.
U.S. Appl. No. 17/273,700, filed Mar. 4, 2021.
U.S. Appl. No. 17/273,711, filed Mar. 4, 2021.
U.S. Appl. No. 17/276,275, filed Mar. 15, 2021.
U.S. Appl. No. 17/276,322, filed Mar. 15, 2021.
U.S. Appl. No. 17/413,612, filed Jun. 14, 2021.
U.S. Appl. No. 17/624,609, filed Jan. 4, 2022.
U.S. Appl. No. 17/623,657, filed Dec. 29, 2021.
U.S. Appl. No. 17/622,891, filed Dec. 27, 2021.
U.S. Appl. No. 17/635,764, filed Feb. 16, 2022.
U.S. Appl. No. 17/635,838, filed Feb. 16, 2022.
U.S. Appl. No. 17/635,892, filed Feb. 16, 2022.
U.S. Appl. No. 17/791,987, filed Jul. 11, 2022.
U.S. Appl. No. 17/792,003, filed Jul. 11, 2022.
Busico et al., "Alk-1-ene Polymerization in the Presence of a Monocyclopentadienyl Zirconium(IV) Acetamidinate Catalyst: Microstructural and Mechanistic Insights[a]", Macromol. Rapid Commun., vol. 28: pp. 1128-1134 (2007).
Castignolles et al., "Detection and quantification of branching in polyacrylates by size-exclusion chromatography (SEC) and melt-state $^{13}$C NMR spectroscopy", Polymer 50, vol. 50: pp. 2373-2383 (Mar. 24, 2009).
Cheng, H.N., "$^{13}$C NMR Analysis of Ethylene-Propylene Rubbers", Macromolecules, vol. 17: pp. 1950-1955 (1984).
Filip et al., "Heteronuclear decoupling under fast MAS by a rotor-synchronized Hahn-echo pulse train", Journal of Magnetic Resonance, vol. 176: pp. 239-243 (Jul. 21, 2005).
Griffin et al., "Low-load rotor-synchronised Hahn-echo pulse train (RS-HEPT)$^1$H decoupling in solid-state NMR: factors affecting MAS spin-echo dephasing times", Magnetic Resonance in Chemistry, vol. 45: pp. S198-S208 (Oct. 16, 2007).
Klimke et al., "Optimisation and Application of Polyolefin Branch Quantification by Melt-State $^{13}$C NMR Spectroscopy" Macromolecular Chemistry and Physics, vol. 207: pp. 382-395 (2006).
Parkinson et al., "Effect of Branch Length on $^{13}$C NMR Relaxation Properties in Molten Poly[ethylene-co-(α-olefin)] Model Systems", Macromolecular Chemistry and Physics, vol. 208: pp. 2128-2133 (2007).
Pollard et al., "Observation of Chain Branching in Polyethylene in the Solid State and Melt via $^{13}$C NMR Spectroscopy and Melt NMR Relaxation Time Measurements", Macromolecules, vol. 37(3): pp. 813-825 (Jan. 16, 2004).
Resconi et al., "Selectivity in Propene Polymerization with Metallocene Catalysts", Chemical Reviews, vol. 100(4): pp. 1253-1345 (Mar. 25, 2000).
Singh et al., "Triad sequence determination of ethylene-propylene copolymers—application of quantitative $^{13}$C NMR", Polymer Testing, vol. 28: pp. 475-479 (2009).

(56) References Cited

OTHER PUBLICATIONS

Wang et al., "Structural Analysis of Ethylene/Propylene Copolymers Synthesized with a Constrained Geometry Catalyst", *Macromolecules*, vol. 33: pp. 1157-1162 (Jan. 22, 2000).
Zhou et al., "A new decoupling method for accurate quantification of polyethylene copolymer composition and triad sequence distribution with $^{13}C$ NMR", *Journal of Magnetic Resonance*, vol. 187: pp. 225-233 (May 23, 2007).
*Plastics Additives Handbook*, 6th edition, Hans Zweifel, Editor, Hanser Publishers, Munich, pp. 1141-1190 (2009).
European Patent Office, Extended European Search Report issued in European Patent Application No. 20170112.5 (Oct. 30, 2020).
European Patent Office, International Search Report issued in International Application No. PCT/EP2021/059256 (Aug. 6, 2021).
European Patent Office, Written Opinion issued in International Application No. PCT/EP2021/059256 (Aug. 6, 2021).
The International Bureau of Wipo, International Preliminary Report on Patentability issued in International Application No. PCT/EP2021/059256 (Oct. 13, 2022).
China National Intellectual Property Administration, The First Office Action issued in Chinese Patent Application No. 202180028182.1 (Mar. 3, 2023).

\* cited by examiner

BLOWN FILM

CROSS-REFERENCE TO RELATED APPLICATIONS

This patent application is the U.S. national phase of International Application No. PCT/EP2021/059256, filed on Apr. 9, 2021, which claims the benefit of European Patent Application No. 20170112.5, filed Apr. 17, 2020, the disclosures of which are incorporated herein by reference in their entireties for all purposes.

This invention relates to blown films, especially monolayer blown films, with an improved property profile, the blown films comprising at least 95.0 wt % of a specific heterophasic propylene copolymer (TERHECO).

BACKGROUND

Polypropylenes succeed more and more to replace polyethylene in many technical fields as quite often the new generation of polypropylenes have enhanced properties compared to conventional polyethylene materials. This applies also for the field of blown films where polypropylene takes advantage of molecular engineering to overcome previous material shortcomings for blown-film production.

The blown films sector constitutes an area of ever-increasing importance in various application segments, such as industry packaging, consumer packaging, bags and sacks, lamination films, barrier films, packaging of food or medical products, agriculture films, hygienic products and products for packaging in general.

For medical applications, such as for medical pouches, as well as food application, such as for food packaging, random heterophasic propylene copolymer (RAHECO) are a material of increasing interest as they combine the benefits of heterophasic propylene copolymers (HECO) and random copolymers. However, common random heterophasic propylene copolymers (RAHECO) provide limited properties especially as regards their sealing properties. Therefore, multilayer structures have been developed where a random heterophasic propylene copolymer (RAHECO) is used as core layer providing softness and toughness in combination with an inner layer made from a random copolymer having a high ethylene content, which provides sealing properties. Such structures, however, introduce a high complexity in conversion and reuse of the materials after the intended use. Thus, monolayer structures with the requested sealing properties are of high interest.

To ensure fast sealing, a low SIT is of advantage. By operating at lower temperature there is the benefit that the article to be sealed is not exposed to high temperatures. There are also economic advantages, since lower temperatures are of course cheaper to generate and maintain.

There are further advantages in avoiding high sealing temperatures, especially when temperature sensitive goods are to be packed.

Furthermore, for packaging material it is also desired to have a material with satisfactory optical properties, such as low haze.

WO 2013/127758 for example discloses heterophasic propylene copolymers (TERHECOs) of propylene, ethylene and 1-hexene, which can be used for film applications. As is shown in the Experimental part of the present invention, the TERHECOs of the inventive examples of WO 2013/127758 have a $MFR_2$ (230° C./2.16 kg) measured according to ISO 1133, in the range of 12 to 17 g/10 min. Although these TERHECOs show quite low sealing initiation temperatures, their optical properties, especially haze and their overall performance expressed by the optomechanical ability could still be improved. Optomechanical ability (OMA) is understood as the ratio of mechanical (especially dart-drop impact strength (DDI) and tensile (MD)) behaviour, to optical performance, namely haze, wherein the mechanical properties are targeted to be as high as possible and the optical performance in the sense of haze is desired to be as low as possible.

Therefore, there is a need in the art for providing a material that combines the benefits of the random heterophasic propylene copolymer (RAHECO) such as softness, and the sealing properties of the random copolymer. Furthermore, it is desired that such a material provides good optical properties and mechanical properties, like tear resistance and dart drop (impact strength). In other words, a material is desirable that provides softness, sealability in combination with good optics and mechanical properties, especially haze, tear resistance and dart drop to films prepared from such a material.

Object of the present invention is to provide a blown film with good mechanical properties, like high tear resistance and dart drop (impact strength), combined with advantageous sealing properties and optics, e.g. low haze.

The finding of the present invention is to provide a blown film based on polypropylene, i.e. a specific heterophasic propylene copolymer (TERHECO) produced with a single-site catalyst.

Thus, according to a first aspect the present invention is directed to blown films comprising at least 95.0 wt % of a heterophasic propylene copolymer (TERHECO) comprising units derived from propylene, ethylene and 1-hexene, the TERHECO having a) an amount of a xylene cold soluble (XCS) fraction determined according to ISO 16152 (25° C.) in the range from 5.0 to 40.0 wt %, based on the total weight of the TERHECO, wherein the xylene cold soluble (XCS) fraction has
 (i) an intrinsic viscosity (IV) determined according to DIN ISO 162/1 (in decalin at 135° C.) in the range from 1.2 to 3.5 dl/g and
 (ii) comprises comonomer units derived from ethylene in an amount from 2.0 to 20.0 wt %, based on the total weight of the xylene cold soluble (XCS) fraction, and derived from 1-hexene in an amount from 1.0 to 20.0 wt %, based on the total weight of the xylene cold soluble (XCS) fraction, b) an amount of a xylene cold insoluble (XCI) fraction determined according to ISO 16152 (25° C.) in the range from 95.0 to 60.0 wt %, based on the total weight of the TERHECO, wherein the xylene cold insoluble (XCI) fraction comprises
 (iii) comonomer units derived from ethylene in an amount from 0.0 to 5.0 wt %, based on the total weight of the xylene cold insoluble (XCI) fraction, and derived from 1-hexene in an amount from 1.0 to 10.0 wt %, based on the total weight of the xylene cold insoluble (XCI) fraction, c) a total ethylene content, based on the weight of the heterophasic propylene copolymer (TERHECO), in the range of 0.1 to 10.0 wt %, d) a total 1-hexene content, based on the weight of the heterophasic propylene copolymer (TERHECO), in the range of 3.0 to 10.0 wt %, e) a melt flow rate $MFR_2$ (230° C./2.16 kg) measured according to ISO 1133 in the range from 0.5 to 4.0 g/10 min, and f) a melting temperature Tm measured by differential scanning calorimetry (DSC) in the range from 120° C. to 145° C.

In an embodiment of the invention, the heterophasic propylene copolymer (TERHECO) consists of units derived from propylene, ethylene and 1-hexene.

In another embodiment, the blown film has an Elmendorf tear strength determined in accordance with ISO 6383/2 measured in machine direction (MD), in the range from at least 5.0 N/mm up to 25.0 N/mm, and measured in transverse direction (TD) in the range of from at least 30.0 N/mm up to 300.0 N/mm.

Preferably the blown film is free of polyethylene, even more preferred the blown film comprises a polypropylene as defined above and further defined below as the only polymer component. Surprisingly, it has been found that blown films based on the specific heterophasic propylene copolymer (TERHECO) produced with a single-site catalyst, have superior properties compared to the films known in the art. The inventive blown films are characterized by a high tear resistance at a low heat sealing initiation temperature (SIT) in comparison to blown films being state of the art. Moreover, the inventive blown films are characterized by an improved property profile due to low haze, low sealing initiation temperature (SIT) and high tear resistance as well as impact strength.

DETAILED DESCRIPTION

In the following, the invention is defined in more detail.

The blown films according to the present invention comprise at least 95.0 wt %, preferably at least 98.0 wt %, like at least 99.0 wt % of a specific heterophasic propylene copolymer (TERHECO).

The Heterophasic Propylene Copolymer (TERHECO)

The heterophasic propylene copolymer (TERHECO) comprises units derived from propylene, ethylene and 1-hexene.

Thus, in an embodiment, the heterophasic propylene copolymer (TERHECO) can comprise further units derived from e.g. 1-butene or the like, preferably in an amount of not more than 5.0 wt %.

In a preferred embodiment, the heterophasic propylene copolymer (TERHECO) consists of units derived from propylene, ethylene and 1-hexene only.

In particular, the 1-hexene content of the heterophasic propylene copolymer (TERHECO) is in the range of 3.0 to 10.0 wt %, preferably in the range of 3.2 to 8.0 wt %, more preferably in the range of 3.5 to 7.0 wt %, still more preferably in the range of 4.0 to 6.0 wt %, like in the range of 4.0 to 5.0 wt %, based on the weight of the heterophasic propylene copolymer (TERHECO).

Further, the ethylene content of the heterophasic propylene copolymer (TERHECO) is in the range of 0.1 to 10.0 wt %, preferably in the range of 0.1 to 6.0 wt %, more preferably in the range of 0.2 to 5.0 wt %, still more preferably in the range of 0.3 to 4.0 wt %, yet more preferably in the range of 0.4 to 3.5 wt %, like in the range of 0.5 to 3.0 wt % or 0.7 to 3.0, based on the weight of the heterophasic propylene copolymer (TERHECO).

The amount of the xylene cold soluble (XCS) fraction (sometimes also referred to as xylene solubles XS) is a parameter frequently used to determine the amount of elastomeric and/or amorphous components within a polymer composition. The measuring method is described in further detail below under the headline "Measuring Methods". As a first approximation, the amount of the xylene cold soluble (XCS) fraction corresponds to the amount of elastomeric components and those polymer chains with low molecular weight and low stereoregularity.

The amount of the xylene cold soluble (XCS) fraction determined according to ISO 16152 (25° C.) of the heterophasic propylene copolymer (TERHECO) is in the range of 5.0 to 40.0 wt %, preferably in the range of 8.0 to 38.0 wt %, more preferably in the range of 10.0 to 35.0 wt %, still more preferably in the range of 12.0 to 30.0 wt %, based on the overall weight of the heterophasic propylene copolymer (TERHECO).

Thus, the amount of the xylene cold insoluble (XCI) fraction determined according to ISO 16152 (25° C.) of the heterophasic propylene copolymer (TERHECO) is in the range of 95.0 to 60.0 wt %, preferably in the range of 92.0 to 62.0 wt %, more preferably in the range of 90.0 to 65.0 wt %, still more preferably in the range of 88.0 to 70.0 wt %, based on the overall weight of the heterophasic propylene copolymer (TERHECO).

The xylene cold soluble (XCS) fraction of the heterophasic propylene copolymer (TERHECO) has a 1-hexene content in the range of 1.0 to 20.0 wt %, more preferably in the range of 1.1 to 10.0 wt %, more preferably in the range of 1.2 to 8.0 wt %, still more preferably in the range of 1.4 to 5.0 wt %, like in the range of 1.5 to 4.5 wt %.

Additionally to the previous paragraph, the xylene cold soluble (XCS) fraction of the heterophasic propylene copolymer (TERHECO) has an ethylene content in the range of 2.0 to 20.0 wt %, more preferably in the range of 3.0 to 18.0 wt %, still more preferably in the range of 4.0 to 14.0 wt %, like in the range of 4.5 to 12.0 wt %.

Further, the xylene cold soluble (XCS) fraction of the heterophasic propylene copolymer (TERHECO) is specified by its intrinsic viscosity (IV). A low intrinsic viscosity (IV) value reflects a low weight average molecular weight. In particular, it is preferred that the intrinsic viscosity (IV) of the xylene cold soluble fraction (XCS) of the heterophasic propylene copolymer (TERHECO) measured according to DIN ISO 1628/1 (in decaline at 135° C.) is in the range of 1.2 to 3.5 dl/g, more preferably in the range of 1.4 to 3.2 dl/g, still more preferably in the range of 1.6 to 3.1 dl/g, like in the range of 1.8 to 3.0 dl/g.

The xylene cold insoluble (XCI) fraction of the heterophasic propylene copolymer (TERHECO) has comonomer units derived from ethylene in an amount from 0.0 to 5.0 wt %, preferably 0.0 to 4.0 wt %, more preferably 0.0 to 3.0 wt % and even more preferably 0.0 to 2.0 wt %, based on the total weight of the xylene cold insoluble (XCI) fraction, and derived from 1-hexene in an amount from 1.0 to 10.0 wt %, based on the total weight of the xylene cold insoluble (XCI) fraction, preferably 1.5 to 8.0 wt %, more preferably 2.0 to 7.0 wt % and even more preferably 2.5 to 6.0 wt %.

Preferably, the ethylene and 1-hexene content together of the heterophasic propylene copolymer (TERHECO) is in the range of 3.1 to 15.0 wt %, more preferably in the range of 4.0 to 12.0 wt %, still more preferably in the range of 4.5 to 10.0 wt %, like in the range of 5.0 to 7.5 wt %, based on the weight of the heterophasic propylene copolymer (TERHECO).

Further, it is preferred that the ethylene and 1-hexene content together of the xylene cold soluble (XCS) fraction of the heterophasic propylene copolymer (TERHECO), based on the weight of xylene cold soluble (XCS) fraction of the heterophasic propylene copolymer (TERHECO), is in the range of 5.0 to 25.0 wt % more preferably in the range of 6.0 to 20.0 wt %, still more preferably in the range of 7.0 to 17.0 wt %, like in the range of 8.0 to 15.0 wt %.

The heterophasic propylene copolymer (TERHECO) has a melting temperature in the range of 120 to 145° C., preferably in the range of 123 to 142° C., and more preferably in the range of 125 to 138° C., like in the range of 128 to 136° C.

Further, it is preferred that the heterophasic propylene copolymer (TERHECO) has a rather low melt flow rate. In particular, the heterophasic propylene copolymer (TERHECO) has a melt flow rate $MFR_2$ (230° C.; 2.16 kg) measured according to ISO 1133 in the range of 0.5 to 4.0 g/10 min, preferably in the range of 0.8 to 3.8 g/10 min, more preferably in the range of 1.0 to 3.5 g/10 min, like in the range of 1.5 to 3.2 g/10 min.

Additionally or alternatively, the heterophasic propylene copolymer (TERHECO) has a flexural modulus determined according to ISO 178 in the range of 300 to 800 MPa, more preferably in the range of 350 to 700 MPa, still more preferably in the range of 400 to 600 MPa and/or a haze measured according to ASTM D1033 on a 1.0 mm thick plaque in the range of from 5.0 to 45.0%, preferably from 8.0 to 35.0% and more preferably from 10.0 to 30.0%.

Additionally or alternatively to the previous paragraph, it is preferred that the heterophasic propylene copolymer (TERHECO) has a Charpy notched impact strength determined according to ISO 179/1 eA at 23° C. in the range of 3.0 to 45 KJ/m2, more preferably in the range of 4.0 to 30 KJ/m2, yet more preferably in the range of 5.0 to 20.0 KJ/m2 and measured −20° C. in the range of 1.0 to 5.0 KJ/m2, more preferably in the range of 1.2 to 4.0 KJ/m2, yet more preferably in the range of 1.4 to 3.0 KJ/m2.

The heterophasic propylene copolymer (TERHECO) can be defined alternatively by comprising a matrix (M) being a crystalline propylene copolymer (PP) and an elastomeric propylene copolymer (EC) dispersed in said matrix (M).

Accordingly, the heterophasic propylene copolymer (TERHECO) is a heterophasic system comprising a crystalline matrix (M) being the crystalline propylene copolymer (PP) and a dispersed phase being the elastomeric propylene copolymer (EC). Accordingly, the propylene copolymer (PP) is preferably a (semi) crystalline propylene copolymer (PP) and the elastomeric propylene copolymer (EC) is an elastomeric polymer and the elastomeric propylene copolymer (EC) is (finely) dispersed in the (semi) crystalline propylene copolymer (PP). In other words, the (semi) crystalline propylene copolymer (PP) constitutes a matrix in which the elastomeric propylene copolymer (EC) forms inclusions in the matrix, i.e. in the (semi) crystalline propylene copolymer (PP). Thus, the matrix contains (finely) dispersed inclusions being not part of the matrix and said inclusions contain the elastomeric propylene copolymer (EC). The term "inclusion" according to this invention shall preferably indicate that the matrix and the inclusion form different phases within the heterophasic propylene copolymer (TERHECO), said inclusions are for instance visible by high-resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Preferably, the weight ratio between the propylene copolymer (PP) and the elastomeric propylene copolymer (EC) [(PP)/(EC)] within the heterophasic propylene copolymer (TERHECO) is in the range of 95/5 to 60/40, more preferably in the range of 90/10 to 65/35, still more preferably in the range of 85/15 to 70/30.

The matrix (M) of the heterophasic propylene copolymer (TERHECO) is the propylene copolymer (PP).

It is preferred that the matrix (M) being the propylene copolymer (PP) has a melt flow rate $MFR_2$ (2.16 kg, 230° C.) determined according to ISO 1133 in the range of 0.5 to 10.0 g/10 min, more preferably in the range of 0.8 to 8.0 g/10 min, still more preferably in the range of 1.0 to 7.0 g/10 min, most preferably in the range of 1.2 to 6.0 g/10 min, most preferably in the range of 1.5 to 4.5 g/10 min.

According to one embodiment of the present invention, the matrix (M) being the propylene copolymer (PP) is a crystalline propylene copolymer (C3/C6-PP) consisting of units derived from propylene and 1-hexene preferably having a 1-hexene content, based on the weight of the crystalline propylene copolymer (C3/C6-PP), in the range of 2.0 to 8.0 wt %, more preferably in the range of 3.0 to 7.0 wt %, still more preferably in the range of 4.0 to 6.0 wt %, like in the range of 4.5 to 5.5 wt %.

According to another embodiment of the present invention, the matrix (M) being the propylene copolymer (PP) is a crystalline propylene terpolymer (C3/C2/C6) consisting of units derived from of propylene, ethylene and 1-hexene preferably having
i) an ethylene content, based on the weight of the crystalline propylene terpolymer (C3/C2/C6), in the range of 0.1 to 2.0 wt %, more preferably in the range of 0.2 to 1.5 wt %, still more preferably in the range of 0.5 to 1.2 wt %, like in the range of 0.6 to 0.9 wt %,
and
ii) a 1-hexene content, based on the weight of the crystalline propylene terpolymer (C3/C2/C6), in the range of 0.5 to 7.0 wt %, more preferably in the range of 2.0 to 6.5 wt %, still more preferably in the range of 3.0 to 6.0 wt. %, like in the range of 4.5 to 5.5 wt %.

The elastomeric propylene copolymer (EC) being the dispersed phase of the heterophasic propylene copolymer (TERHECO) is a terpolymer (T) consisting of units derived from propylene, ethylene and 1-hexene.

The heterophasic propylene copolymer (TERHECO) can be produced by blending the propylene copolymer (PP) and the elastomeric propylene copolymer (EC). However, it is preferred that the heterophasic propylene copolymer (TERHECO) is produced in a sequential step process, using reactors in serial configuration and operating at different reaction conditions. As a consequence, each fraction prepared in a specific reactor may have its own molecular weight distribution and/or comonomer content distribution.

Accordingly, it is preferred that the heterophasic propylene copolymer (TERHECO) is produced in a sequential polymerization process comprising at least the steps of
(a) polymerizing propylene, 1-hexene and optionally ethylene in a first reactor (R1) obtaining the propylene copolymer (PP), i.e. the matrix (M) of the heterophasic propylene copolymer (TERHECO),
(b) transferring the propylene copolymer (PP) of step (a) into a second reactor (R2),
(c) polymerizing in the second reactor (R2) and in the presence of the propylene copolymer (PP) obtained in step (a) propylene, 1-hexene and ethylene to obtain the elastomeric propylene copolymer (EC) dispersed in the propylene copolymer (PP), the propylene copolymer (PP) and the elastomeric propylene copolymer (EC) form the heterophasic propylene copolymer (TERHECO).

Alternatively, it is preferred that the heterophasic propylene copolymer (TERHECO) is produced in a sequential polymerization process comprising at least the steps of (a) polymerizing propylene, 1-hexene and optionally ethylene in a first reactor (R1) obtaining a first polypropylene fraction of the propylene copolymer (PP),
(b) transferring the first polypropylene fraction into a second reactor (R2),
(c) polymerizing in the second reactor (R2) and in the presence of said first polypropylene fraction propylene, 1-hexene and optionally ethylene, obtaining thereby a second polypropylene fraction, said first polypropylene fraction and said second polypropylene fraction form the propylene copolymer (PP), i.e. the matrix (M) of the heterophasic propylene copolymer (TERHECO),
(d) transferring the propylene copolymer (PP) of step (c) into a third reactor (R3),
(e) polymerizing in the third reactor (R3) and in the presence of the propylene copolymer (PP) obtained in step (c) propylene, 1-hexene and ethylene to obtain the elastomeric propylene copolymer (EC) dispersed in the propylene copolymer (PP), the propylene copolymer (PP) and the elastomeric propylene copolymer (EC) form the heterophasic propylene copolymer (TERHECO).

Of course, in the first reactor (R1) the second polypropylene fraction can be produced and in the second reactor (R2) the first polypropylene fraction can be obtained.

The term "sequential polymerization process" indicates that the heterophasic propylene copolymer (TERHECO) is produced in at least two, like three reactors connected in series. Accordingly, the present process comprises at least a first reactor (R1) and a second reactor (R2), more preferably a first reactor (R1), a second reactor (R2) and a third reactor (R3). The term "polymerization reactor" shall indicate that the main polymerization takes place. Thus in case the process consists of three polymerization reactors, this definition does not exclude the option that the overall process comprises for instance a pre-polymerization step in a pre-polymerization reactor. The term "consist of" is only a closing formulation in view of the main polymerization reactors.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention, the slurry reactor (SR) is preferably a (bulk) loop reactor (LR).

The second reactor (R2) can be a slurry reactor, like a loop reactor, as the first reactor or alternatively a gas phase reactor (GPR).

The third reactor (R3) is preferably gas phase reactors (GPR).

Such gas phase reactors (GPR) can be any mechanically mixed or fluid bed reactors. Preferably, the gas phase reactors (GPR) comprise a mechanically agitated fluid bed reactor with gas velocities of at least 0.2 m/sec. Thus, it is appreciated that the gas phase reactor is a fluidized bed type reactor preferably with a mechanical stirrer.

Thus, in a preferred embodiment the first reactor (R1) is a slurry reactor (SR), like a loop reactor (LR), whereas the second reactor (R2) and the third reactor (R3) are gas phase reactors (GPR). Accordingly, for the instant process at least three, preferably three polymerization reactors, namely a slurry reactor (SR), like a loop reactor (LR), a first gas phase reactor (GPR-1) and a second gas phase reactor (GPR-2) connected in series are used. If needed prior to the slurry reactor (SR) a pre-polymerization reactor is placed.

In another preferred embodiment the first reactor (R1) and second reactor (R2) are slurry reactors (SR), like a loop reactors (LR), whereas the third reactor (R3) is a gas phase reactor (GPR). Accordingly for the instant process at least three, preferably three polymerization reactors, namely two slurry reactors (SR), like two loop reactors (LR), and one gas phase reactors (GPR) connected in series are used. If needed prior to the first slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic propylene copolymer (TERHECO) as defined above the conditions for the first reactor (R1), i.e. the slurry reactor (SR), like a loop reactor (LR), of step (a) may be as follows:
the temperature is within the range of 50° C. to 110° C., preferably between 60° C. and 100° C., more preferably between 62° C. and 80° C.,
the pressure is within the range of 20 bar to 80 bar, preferably between 30 bar to 60 bar,
hydrogen can be added for controlling the molar mass in a manner known per se.

Preferably, in the instant process for producing the heterophasic propylene copolymer (TERHECO) as defined above the conditions for the gas phase reactor(s) (GPR) may be as follows:
the temperature is within the range of 50° C. to 130° C., preferably between 60° C. and 100° C.,
the pressure is within the range of 5 bar to 50 bar, preferably between 13 bar to 35 bar,
hydrogen can be added for controlling the molar mass in a manner known per se.

The residence time can vary in the three reactor zones.

In one embodiment of the process for producing the polypropylene the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 4.0 hours.

In case a third reactor (R3), i.e. gas phase reactor (GPR-2) is used, the conditions and residence times in reactor (R3) are preferably identical with the conditions and residence times in reactor (R2) as outlined in the previous paragraphs.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably, the process comprises also a prepolymerization with the catalyst system, as described in detail below.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10° C. to 60° C., preferably from 15° C. to 50° C., and more preferably from 18° C. to 45° C.

The pressure in the prepolymerization reactor is not critical, but must be sufficiently high to maintain the reaction mixture in liquid phase. Thus, the pressure may be from 20 to 80 bar, for example 30 to 60 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

The heterophasic propylene copolymer (TERHECO) suitable for the blown film according to the invention is obtained by a multistage polymerization process, as described above, in the presence of a catalyst system comprising a metallocene catalyst.

In particular, the catalyst system as used in the present invention includes a catalyst component according to formula (I)

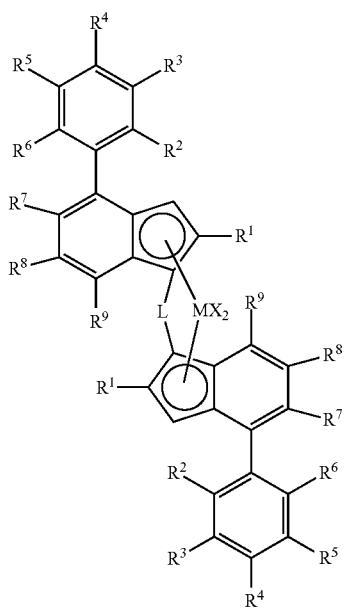

(I)

wherein
M is zirconium or hafnium;
each X independently is a sigma-donor ligand
L is a bridge of formula $-(ER^{10}_2)_y-$;
y is 1 or 2;
E is C or Si;
each $R^{10}$ is independently a $C_1$-$C_{20}$-hydrocarbyl group, tri($C_1$-$C_{20}$ alkyl) silyl group, $C_6$-$C_{20}$ aryl group, $C_7$-$C_{20}$ arylalkyl group or $C_7$-$C_{20}$ alkylaryl group or L is an alkylene group such as methylene or ethylene;
$R^1$ are each independently the same or are different from each other and are a $CH_2$—$R^{11}$ group, with $R^{11}$ being H or linear or branched $C_1$-$C_6$ alkyl group, $C_3$-$C_8$ cycloalkyl group, $C_6$-$C_{10}$ aryl group;
$R^3$, $R^4$ and $R^5$ are each independently the same or different from each other and are H or a linear or branched $C_1$-$C_6$ alkyl group, $C_7$-$C_{20}$ arylalkyl group, $C_7$-$C_{20}$ alkylaryl group, or $C_6$-$C_{20}$ aryl group with the proviso that if there are four or more $R^3$, $R^4$ and $R^5$ groups different from H present in total, one or more of $R^3$, $R^4$ and $R^5$ is other than tert butyl;
$R^7$ and $R^8$ are each independently the same or different from each other and are H, a $CH_2$—$R^{12}$ group, with $R^{12}$ being H or linear or branched $C_1$-$C_6$ alkyl group, $SiR^{13}_3$, $GeR^{13}_3$, $OR^{13}$, $SR^{13}$, $NR^{13}_2$,
wherein
$R^{13}$ is a linear or branched $C_1$-$C_6$ alkyl group, $C_7$-$C_{20}$ alkylaryl group and $C_7$-$C_{20}$ arylalkyl group or $C_6$-$C_{20}$ aryl group.

The catalyst system may include also
(ii) a cocatalyst system comprising a boron containing cocatalyst and/or an aluminoxane cocatalyst.

It should be stressed that, in some instances the use of such cocatalyst may not be required.

The catalyst system of the invention can be used in non-supported form or in solid form.

The catalyst system of the invention may be used as a homogeneous catalyst system or heterogeneous catalyst system.

The catalyst system in solid form, preferably in solid particulate form can be either supported on an external carrier material, like silica or alumina, or, in a particularly preferred embodiment, is free from an external carrier, however still being in solid form. For example, the solid catalyst system is obtainable by a process in which
(a) a liquid/liquid emulsion system is formed, said liquid/liquid emulsion system comprising a solution of the catalyst components (i) and (ii) dispersed in a solvent so as to form dispersed droplets; and
(b) solid particles are formed by solidifying said dispersed droplets.

Particular complexes of the invention include:
Rac-anti-dimethylsilanediyl[2-methyl-4-(4-tert-butylphenyl)-5,6,7-trihydro-s-indacen-1-yl][2-methyl-4-(4-tert-butylphenyl)-5-methoxy-6-tert-butylindenyl zirconium dichloride or dimethyl,
Rac-anti-dimethylsilanediyl[2-iso-butyl-4-(4-tert-butylphenyl)-5,6,7-trihydro-s-indacen-1-yl][2-methyl-4-(4-tert-butylphenyl)-5-methoxy-6-tert-butylindenyl zirconium dichloride or dimethyl,
Rac-anti-dimethylsilanediyl[2-neo-pentyl-4-(4-tert-butylphenyl)-5,6,7-trihydro-s-indacen-1-yl][2-methyl-4-(4-tert-butylphenyl)-5-methoxy-6-tert-butylindenyl zirconium dichloride or dimethyl,
Rac-anti-dimethylsilanediyl[2-benzyl-4-(4-tert-butylphenyl)-5,6,7-trihydro-s-indacen-1-yl][2-methyl-4-(4-tert-butylphenyl)-5-methoxy-6-tert-butylindenyl zirconium dichloride or dimethyl,
Rac-anti-dimethylsilanediyl[2-cyclohexylmethyl-4-(4-tert-butylphenyl)-5,6,7-trihydro-s-indacen-1-yl][2-methyl-4-(4-tert-butylphenyl)-5-methoxy-6-tert-butylindenyl zirconium dichloride or dimethyl,
Race-anti-dimethylsilanediyl[2-methyl-4-(3,5-dimethylphenyl)-5,6,7-trihydro-s-indacen-1-yl][2-methyl-4-(3,5-dimethylphenyl)-5-methoxy-6-tert-butylindenyl zirconium dichloride or dimethyl,
Rac-anti-dimethylsilanediyl[2-iso-butyl-4-(3,5-dimethylphenyl)-5,6,7-trihydro-s-indacen-1-yl][2-methyl-4-(3, 5-dimethylphenyl)-5-methoxy-6-tert-butylindenyl zirconium dichloride or dimethyl,
Rac-anti-dimethylsilanediyl[2-neo-pentyl-4-(3,5-dimethylphenyl)-5,6,7-trihydro-s-indacen-1-yl][2-methyl-4-(3,5-dimethylphenyl)-5-methoxy-6-tert-butylindenyl zirconium dichloride or dimethyl,
Rac-anti-dimethylsilanediyl[2-benzyl-4-(3,5-dimethylphenyl)-5,6,7-trihydro-s-indacen-1-yl][2-methyl-4-(3,5-dimethylphenyl)-5-methoxy-6-tert-butylindenyl zirconium dichloride or dimethyl, and
Rac-anti-dimethylsilanediyl[2-cyclohexylmethyl-4-(3,5-dimethylphenyl)-5,6,7-trihydro-s-indacen-1-yl][2-methyl-4-(3,5-dimethylphenyl)-5-methoxy-6-tert-butylindenyl zirconium dichloride or dimethyl.

The catalysts have been described inter alia in WO2015/011135, which is incorporated by reference herewith. A particularly preferred catalyst is catalyst number 3 of WO2015/011135. The preparation of the metallocenes has been described in WO2013/007650, which is incorporated by reference herewith. The complex preparation of the particular preferred catalyst has been described as E2 in WO2013/007650.

For the avoidance of doubt, any narrower definition of a substituent offered above can be combined with any other broad or narrowed definition of any other substituent. Throughout the disclosure above, where a narrower definition of a substituent is presented, that narrower definition is deemed disclosed in conjunction with all broader and narrower definitions of other substituents in the application.

The ligands required to form the complexes and hence catalysts/catalyst system of the invention can be synthesized by any process and the skilled organic chemist would be able to devise various synthetic protocols for the manufacture of the necessary ligand materials. For Example WO 2007/116034 discloses the necessary chemistry. Synthetic protocols can also generally be found in WO 2002/02576, WO 2011/135004, WO 2012/084961, WO 2012/001052, WO 2011/076780 and WO 2015/158790. The examples section also provides the skilled person with sufficient direction.

As stated above a cocatalyst is not always required. However, when used, the cocatalyst system comprises a boron containing cocatalyst and/or, preferably as well as an aluminoxane cocatalyst.

The aluminoxane cocatalyst can be one of formula (X):

where n is usually from 6 to 20 and R has the meaning below.

Aluminoxanes are formed on partial hydrolysis of organoaluminum compounds, for example those of the formula $AlR_3$, $AlR_2Y$ and $Al_2R_3Y_3$ where R can be, for example, $C_1$-$C_{10}$ alkyl, preferably $C_1$-$C_5$ alkyl, or $C_3$-$C_{10}$-cycloalkyl, $C_7$-$C_{12}$-arylalkyl or alkylaryl and/or phenyl or naphthyl, and where Y can be hydrogen, halogen, preferably chlorine or bromine, or $C_1$-$C_{10}$ alkoxy, preferably methoxy or ethoxy. The resulting oxygen-containing aluminoxanes are not in general pure compounds but mixtures of oligomers of the formula (X).

The preferred aluminoxane is methylaluminoxane (MAO). Since the aluminoxanes used according to the invention as cocatalysts are not, owing to their mode of preparation, pure compounds, the molarity of aluminoxane solutions hereinafter is based on their aluminium content.

According to the present invention the aluminoxane cocatalyst is preferably used in combination with a boron containing cocatalyst, i.e. when a cocatalyst system or a cocatalyst is present, which is usually not required. Boron based cocatalysts can in principle also be used as the only cocatalyst.

Boron based cocatalysts of interest include those of formula (Z)

wherein Y independently is the same or can be different and is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine. Preferred examples for Y are methyl, propyl, isopropyl, isobutyl or trifluoromethyl, unsaturated groups such as aryl or haloaryl like phenyl, tolyl, benzyl groups, p-fluorophenyl, 3,5-difluorophenyl, pentachlorophenyl, pentafluorophenyl, 3,4,5-trifluorophenyl and 3,5-di(trifluoromethyl)phenyl. Preferred options are trifluoroborane, triphenylborane, tris(4-fluorophenyl)borane, tris(3,5-difluorophenyl)borane, tris(4-fluoromethylphenyl)borane, tris(2,4,6-trifluorophenyl)borane, tris(penta-fluorophenyl)borane, tris(tolyl)borane, tris(3,5-dimethyl-phenyl)borane, tris(3,5-difluorophenyl)borane and/or tris(3,4,5-trifluorophenyl)borane. Particular preference is given to tris(pentafluorophenyl)borane.

Borates can be used, i.e. compounds containing a borate 3+ ion. Such ionic cocatalysts preferably contain a non-coordinating anion such as tetrakis(pentafluorophenyl)borate and tetraphenylborate. Suitable counterions are protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N-dimethylanilinium or p-nitro-N,N-dimethylanilinium.

Preferred ionic compounds which can be used according to the present invention include:
triethylammoniumtetra(phenyl)borate,
tributylammoniumtetra(phenyl)borate,
trimethylammoniumtetra(tolyl)borate,
tributylammoniumtetra(tolyl)borate,
tributylammoniumtetra(pentafluorophenyl)borate,
tripropylammoniumtetra(dimethylphenyl)borate,
tributylammoniumtetra(trifluoromethylphenyl)borate,
tributylammoniumtetra(4-fluorophenyl)borate,
N,N-dimethylcyclohexylammoniumtetrakis(pentafluorophenyl)borate,
N,N-dimethylbenzylammoniumtetrakis(pentafluorophenyl)borate,
N,N-dimethylaniliniumtetra(phenyl)borate,
N,N-diethylaniliniumtetra(phenyl)borate,
N,N-dimethylaniliniumtetrakis(pentafluorophenyl)borate,
N,N-di(propyl)ammoniumtetrakis(pentafluorophenyl)borate,
di(cyclohexyl)ammoniumtetrakist(pentafluorophenyl)borate,
triphenylphosphoniumtetrakis(phenyl)borate,
triethylphosphoniumtetrakis(phenyl)borate,
diphenylphosphoniumtetrakis(phenyl)borate,
tri(methylphenyl)phosphoniumtetrakis(phenyl)borate, tri(dimethylphenyl)phosphoniumtetrakis(phenyl)borate, triphenylcarbeniumtetrakis(pentafluorophenyl)borate, orferroceniumtetrakis(pentafluorophenyl)borate.

Preference is given to triphenylcarbeniumtetrakis(pentafluorophenyl)borate, N,N-dimethylcyclohexylammoniumtetrakis(pentafluorophenyl)borate or N,N-dimethylbenzylammoniumtetrakis(pentafluorophenyl)borate.

Suitable amounts of cocatalyst will be well known to the skilled man.

The molar ratio of boron to the metal ion of the metallocene may be in the range 0.5:1 to 10:1 mol/mol, preferably 1:1 to 10:1, especially 1:1 to 5:1 mol/mol.

The molar ratio of Al in the aluminoxane to the metal ion of the metallocene may be in the range 1:1 to 2000:1 mol/mol, preferably 10:1 to 1000:1, and more preferably 50:1 to 500:1 mol/mol.

Further, the heterophasic propylene copolymer (TERHECO) may contain additives (AD).

The Additives (AD)

Typical additives are acid scavengers, antioxidants, colorants, light stabilisers, plasticizers, slip agents, anti-scratch agents, dispersing agents, processing aids, lubricants, pigments, nucleating agents, inorganic fillers and the like. The total content of such additives in the film shall not exceed 3.0 wt %, preferably being less than 2.0 wt %, like less than 1.0 wt %.

Such additives are commercially available and for example described in "Plastic Additives Handbook", 6$^{th}$ edition 2009 of Hans Zweifel (pages 1141 to 1190).

Furthermore, the term "additives (AD)" according to the present invention also includes carrier materials, in particular polymeric carrier materials.

The Polymeric Carrier Material

The polymeric carrier material of the additives (AD) is a carrier polymer to ensure a uniform distribution in the polyolefin composition (C) of the invention. The polymeric carrier material is not limited to a particular polymer. The polymeric carrier material may be ethylene homopolymer, ethylene copolymer obtained from ethylene and α-olefin comonomer such as $C_3$ to $C_8$ α-olefin comonomer, propylene homopolymer and/or propylene copolymer obtained from propylene and α-olefin comonomer such as ethylene and/or $C_4$ to $C_8$ α-olefin comonomer.

The Blown Film

The present invention is related to a blown film comprising at least 95.0 wt %, more preferably at least 98.0 wt % and even more preferably at least 99.0 wt % of the above described heterophasic propylene copolymer (TERHECO).

Moreover, the blown films of the invention preferably consist of the heterophasic propylene copolymer (TERHECO) as the sole polymer component. However, it is to be understood herein that the films may comprise further components such as additives, which may optionally be added in a mixture with a carrier polymer, i.e. in a so-called master batch.

The films of the invention may be multilayer or monolayer films, but are preferably monolayer films.

Mono-layer films having a thickness of 5 to 300 µm, preferably 10 to 200 µm, more preferably 20 to 150 µm are suitable according to the present invention.

Blown films according to the invention have according to an embodiment a high Elmendorf tear strength as determined in accordance with ISO 6383/2. As measured in machine direction (MD), the tear strength is in the range of from at least 5.0 N/mm up to 25.0 N/mm, preferably in the range of 8.0 up to 22.0 N/mm, like in the range of 10.0 to 20.0 N/mm.

As measured in transverse direction (TD), the tear strength is in the range of from at least 30.0 N/mm up to 300.0 N/mm, preferably in the range of 35.0 to 250.0 N/mm, like in the range of 40.0 to 230.0 N/mm.

The tensile modulus of the blown film itself shall be moderate. Thus, the tensile modulus of the blown film based on heterophasic propylene copolymer (TERHECO) shall be less than 800 MPa, more preferably less than 750 MPa.

The tensile modulus determined according to ISO 527 at 23° C. on blown films with a thickness of 50 µm in machine direction as well as in transverse direction is therefore in the range of from 200 to 750 MPa, preferably of from 300 to 700 MPa.

In addition or alternatively, the blown film shall have a dart-drop impact strength (DDI) determined according to ASTM D1709, method A on a 50 µm blown film of at least 150 g up to 800 g, more preferably in the range of 180 to 700 g, still more preferably in the range of 200 to 600 g.

Films of the invention preferably have a sealing initiation temperature (SIT) (determined on 50 µm blown film as described in the experimental part) in the range of from 80° C. to below 115° C., preferably 85° C. to 112° C., more preferably 90° C. to 110° C.

It is furthermore especially preferred that the difference between melting temperature Tm and SIT, (Tm–SIT), is rather high. Said (Tm–SIT) shall be in the range of 20° C. to 40° C., preferably 22° C. to 38° C. and even more preferably 24° C. to 36° C.

The films can furthermore have a haze (determined according to ASTM D 1003-00 on 50 µm blown film) in the range of from 0.5 to 10.0%, preferably from 0.8 to 5.0% and more preferably from 1.0 to 3.5%.

Viewed from another aspect, it is a constant need to provide films, which not only show improvements in one or two of these mechanical or optical properties. So it is desired to provide products with a well-balanced and continuously improved overall performance. Such an improvement in the overall performance of a blown film can be expressed by the optomechanical ability.

In view of the present invention, optomechanical ability (OMA) is understood as the ratio of mechanical (especially dart-drop impact strength (DDI) and tensile (MD)) behaviour, to optical performance, namely haze, wherein the mechanical properties are targeted to be as high as possible and the optical performance in the sense of haze is desired to be as low as possible. The optomechanical ability can be determined by multiplying Tensile Modulus (MD) and dart-drop impact strength (DDI; determined according to ASTM D1709, method A on a 50 µm blown film) and putting this product in relation to haze determined on 50 µm blown film.

The optomechanical ability (OMA) is therefore determined according the formula given below:

$$OMA = \frac{\text{Tensile Modulus } (MD)[MPa] * DDI(g)}{\text{Haze}(50 \text{ µm})[\%]}$$

Thus in one further embodiment of the present invention, the optomechanical ability (OMA) of films determined on 50 µm blown film is at least 30 000 [MPa*g/%] up to 170 000 [MPa*g/%], preferably in the range of from 40 000 [MPa*g/%] up to 150 000 [MPa*g/%], more preferably in the range of from 45 000 [MPa*g/%] up to 130 000 [MPa*g/%], wherein the Tensile Modulus in machine direction is measured according to ISO 527-3 at 23° C. on 50 µm blown films, DDI is the dart-drop impact strength determined according to ASTM D1709, method A on a 50 μm blown film and haze is measured according to ASTM D1033 on a 50 μm blown film.

It will be appreciated that any parameter mentioned above is measured according to the detailed test given below. In any parameter where a narrower and broader embodiment are disclosed, those embodiments are disclosed in connection with the narrower and broader embodiments of other parameters.

For manufacturing the blown film, a melt of the heterophasic propylene copolymer (TERHECO) is extruded through an annular die and blown into a tubular film.

Thus, the present invention is related to the manufacture of the inventive blown film by extrusion of the heterophasic propylene copolymer (TERHECO) as defined herein by conventional blown film extrusion, i.e. the heterophasic propylene copolymer (TERHECO) is extruded through a die, preferably circular die, followed by forming a bubble which is collapsed between nip rollers after solidification. The blown extrusion can preferably be effected at a temperature in the range 160 to 240° C., whereby cooling by water or preferably by blowing gas (generally air) is done at a temperature of 10 to 50° C. to provide a frost line height of 0.5 to 8 times the diameter of the die. The blow up ratio should generally be in the range of from 1.5 to 4, such as in the range of from 2 to 4 and preferably in the range of from 2.5 to 3.5.

Furthermore, the present invention is also directed to the use of the inventive blown film, as packaging material, in particular as a packaging material for food and/or medical products.

In addition, the present invention is related to articles comprising a blown film as defined herein.

The invention will now be described with reference to the following non-limiting examples.

EXAMPLES

1. Measuring Methods

The following definitions of terms and determination methods apply for the above general description of the invention as well as to the below examples unless otherwise defined.

MFR$_2$ (230° C.) is measured according to ISO 1133 (230° C., 2.16 kg load).

Quantification of Microstructure by NMR Spectroscopy

Comonomer content (ethylene): Quantitative $^{13}$C $\{^1H\}$ NMR spectra were recorded in the solution-state using a Bruker Advance III 400 NMR spectrometer operating at 400.15 and 100.62 MHz for $^1$H and $^{13}$C respectively. All spectra were recorded using a $^{13}$C optimized 10 mm extended temperature probehead at 125° C. using nitrogen gas for all pneumatics. Approximately 200 mg of material was dissolved in 3 ml of 1,2-tetrachloroethane-d2 (TCE-d2) along with chromium-(III)-acetylacetonate (Cr(acac)$_3$) resulting in a 65 mM solution of relaxation agent in solvent as described in G. Singh, A. Kothari, V. Gupta, Polymer Testing 2009, 28 (5), 475.

To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimized tip angle, 1 s recycle delay and a bi-level WALTZ16 decoupling scheme as described in Z. Zhou, R. Kuemmerle, X. Qiu, D. Redwine, R. Cong, A. Taha, D. Baugh, B. Winniford, J. Mag. Reson. 187 (2007) 225 and V. Busico, P. Carbonniere, R. Cipullo, C. Pellecchia, J. Severn, G. Talarico, Macromol. Rapid Commun. 2007, 28, 1128. A total of 6144 (6 k) transients were acquired per spectra. Quantitative $^{13}$C $\{^1H\}$ NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present.

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

Characteristic signals corresponding to the incorporation of ethylene were observed (as described in Cheng, H. N., Macromolecules 1984, 17, 1950) and the comonomer fraction calculated as the fraction of ethylene in the polymer with respect to all monomer in the polymer. The comonomer fraction was quantified using the method of W-J. Wang and S. Zhu, Macromolecules 2000, 33 1157, through integration of multiple signals across the whole spectral region in the $^{13}$C $\{^1H\}$ spectra. This method was chosen for its robust nature and ability to account for the presence of regio-defects when needed. Integral regions were slightly adjusted to increase applicability across the whole range of encountered comonomer contents.

Comonomer content (1-hexene): Quantitative $^{13}$C $\{^1H\}$ NMR spectra recorded in the molten-state using a Bruker Avance III 500 NMR spectrometer operating at 500.13 and 125.76 MHz for $^1$H and $^{13}$C respectively. All spectra were recorded using a $^{13}$C optimised 7 mm magic-angle spinning (MAS) probehead at 180° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification. (Klimke, K., Parkinson, M., Piel, C., Kaminsky, W., Spiess, H. W., Wilhelm, M., Macromol. Chem. Phys. 2006; 207:382, Parkinson, M., Klimke, K., Spiess, H. W., Wilhelm, M., Macromol. Chem. Phys. 2007; 208:2128, Castignolles, P., Graf, R., Parkinson, M., Wilhelm, M., Gaborieau, M., Polymer 50 (2009) 2373). Standard single-pulse excitation was employed utilising the NOE at short recycle delays of 3 s (Klimke, K., Parkinson, M., Piel, C., Kaminsky, W., Spiess, H. W., Wilhelm, M., Macromol. Chem. Phys. 2006; 207:382, Pollard, M., Klimke, K., Graf, R., Spiess, H. W., Wilhelm, M., Sperber, O., Piel, C., Kaminsky, W., Macromolecules 2004; 37:813), and the RS-HEPT decoupling scheme (Filip, X., Tripon, C., Filip, C., J. Mag. Resn. 2005, 176, 239, Griffin, J. M., Tripon, C., Samoson, A., Filip, C., and Brown, S. P., Mag. Res. in Chem. 2007 45, S1, S198). A total of 16384 (16k) transients were acquired per spectra.

Quantitative $^{13}$C $\{^1H\}$ NMR spectra were processed, integrated and relevant quantitative properties determined from the integrals. All chemical shifts are internally referenced to the methyl isotactic pentad (mmmm) at 21.85 ppm.

Characteristic signals corresponding to the incorporation of 1-hexene were observed and the comonomer content quantified in the following way.

The amount of 1-hexene incorporated in PHP isolated sequences was quantified using the integral of the αB4 sites at 44.2 ppm accounting for the number of reporting sites per comonomer:

$$H = I_{\alpha B4}/2$$

The amount of 1-hexene incorporated in PHHP double consecutive sequences was quantified using the integral of the ααB4 site at 41.7 ppm accounting for the number of reporting sites per comonomer:

$$HH = 2*I_{\alpha\alpha B4}$$

When double consecutive incorporation was observed the amount of 1-hexene incorporated in PHP isolated sequences needed to be compensated due to the overlap of the signals αB4 and αB4B4 at 44.4 ppm:

$$H = (I_{\alpha B4} - 2*I_{\alpha\alpha B4})/2$$

The total 1-hexene content was calculated based on the sum of isolated and consecutively incorporated 1-hexene:

$$H\text{total} = H + HH$$

When no sites indicative of consecutive incorporation observed the total 1-hexene comonomer content was calculated solely on this quantity:

$$H\text{total} = H$$

Characteristic signals indicative of regio 2,1-erythro defects were observed (Resconi, L., Cavallo, L., Fait, A., Piemontesi, F., Chem. Rev. 2000, 100, 1253).

The presence of 2,1-erythro regio defects was indicated by the presence of the Pαβ (21e8) and Pαγ (21e6) methyl sites at 17.7 and 17.2 ppm and confirmed by other characteristic signals. The total amount of secondary (2,1-erythro) inserted propene was quantified based on the αα21e9 methylene site at 42.4 ppm:

$$P21 = I_{\alpha\alpha 21e9}$$

The total amount of primary (1,2) inserted propene was quantified based on the main Sαα methylene sites at 46.7 ppm and compensating for the relative amount of 2,1-erythro, αB4 and ααB4B4 methylene unit of propene not accounted for (note H and HH count number of hexene monomers per sequence not the number of sequences):

$$P12 = I_{S\alpha\alpha} + 2*P21 + H + HH/2$$

The total amount of propene was quantified as the sum of primary (1,2) and secondary (2,1-erythro) inserted propene:

$$P\text{total} = P12 + P21 = I_{S\alpha\alpha} + 3*I_{\alpha\alpha 21e9} + (I_{\alpha B4} - 2*I_{\alpha\alpha B4})/2 + I_{\alpha\alpha B4}$$

This simplifies to:

$$P\text{total} = I_{S\alpha\alpha} + 3*I_{\alpha\alpha 21e9} + 0.5*I_{\alpha B4}$$

The total mole fraction of 1-hexene in the polymer was then calculated as:

$$fH = H\text{total}/(H\text{total} + P\text{total})$$

The full integral equation for the mole fraction of 1-hexene in the polymer was:

$$fH = (((I_{\alpha B4} - 2*I_{\alpha\alpha B4})/2) + (2*I_{\alpha\alpha B4}))/((I_{S\alpha\alpha} + 3*I_{\alpha\alpha 21e9} + 0.5*I_{\alpha B4}) + ((I_{\alpha B4} - 2*I_{\alpha\alpha B4})/2) + (2*I_{\alpha\alpha B4}))$$

This simplifies to:

$$fH = (I_{\alpha B4}/2 + I_{\alpha\alpha B4})/(I_{S\alpha\alpha} + 3*I_{\alpha\alpha 21e9} + I_{\alpha B4} + I_{\alpha\alpha B4})$$

The total comonomer incorporation of 1-hexene in mole percent was calculated from the mole fraction in the usual manner:

$$H[\text{mol \%}] = 100*fH$$

The total comonomer incorporation of 1-hexene in weight percent was calculated from the mole fraction in the standard manner:

$$H[\text{wt \%}] = 100*(fH*84.16)/((fH*84.16) + ((1-fH)*42.08))$$

Intrinsic viscosity is measured according to DIN ISO 1628/1, October 1999 (in Decalin at 135° C.).

Density is measured according to ISO 1183-187. Sample preparation is done either by compression moulding in accordance with ISO 1872-2:2007 or 10×10×2 mm specimen were cut from injection-moulded parts.

The xylene solubles (XCS, wt %): Content of xylene cold solubles (XCS) is determined at 25° C. according ISO 16152; first edition; 2005 Jul. 1. The part which remains insoluble is the xylene cold insoluble (XCI) fraction.

Differential Scanning Calorimetry (DSC)

Differential scanning calorimetry (DSC) analysis, melting temperature ($T_m$) and melt enthalpy ($H_m$), crystallization temperature ($T_c$), and heat of crystallization ($H_c$, $H_{CR}$) are measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature ($T_c$) and heat of crystallization ($H_c$) are determined from the cooling step, while melting temperature ($T_m$) and melt enthalpy (Hm) are determined from the second heating step.

Throughout the patent the term Tc or (Tcr) is understood as Peak temperature of crystallization as determined by DSC at a cooling rate of 10 K/min.

Dynamic Mechanical Thermal Analysis (DMTA)

The glass transition temperature Tg is determined by dynamic mechanical thermal analysis (DMTA) according to ISO 6721-7. The measurements are done in torsion mode on compression moulded samples (40×10×1 mm3) between −100° C. and +150° C. with a heating rate of 2° C./min and a frequency of 1 Hz. Storage modulus G' is determined at +23° C. according ISO 6721-7:1996. The measurements are done in torsion mode on compression moulded samples (40×10×1 mm3) between −150° C. and +150° C. with a heating rate of 2° C./min and a frequency of 1 Hz.

Flexural Modulus

The flexural modulus was determined in 3-point-bending at 23° C. according to ISO 178 on 80×10×4 mm3 test bars injection moulded in line with EN ISO 1873-2.

Notched Impact Strength (NIS):

The Charpy notched impact strength (NIS) was measured according to ISO 179 1 eA at +23° C., using injection moulded bar test specimens of 80×10×4 mm$^3$ prepared in accordance with EN ISO 1873-2.

Haze

Haze is determined according to ASTM D1003-00 on 60×60×1 mm$^3$ plaques injection moulded in line with EN ISO 1873-2 and indicated as Haze$_1$ Haze for films were determined according to ASTM D1003-00 on blown films with a thickness of 50 μm produced as indicated below.

Sealing Initiation Temperature (SIT); (Sealing End Temperature (SET), Sealing Range)

The sealing temperature range is the temperature range, in which the films can be sealed according to conditions given below. The lower limit (heat sealing initiation temperature (SIT)) is the sealing temperature at which a sealing strength of >5 N is achieved. The upper limit (sealing end temperature (SET)) is reached, when the films stick to the sealing device. The sealing range was determined on a J&B Universal Sealing Machine Type 3000 with a film of 50 μm thickness with the following further parameters:

Specimen width: 25.4 mm
Seal Pressure: 0.1 N/mm$^2$
Seal Time: 0.1 s
Cool time: 99 s
Peel Speed: 10 mm/s
Start temperature: 80° C.
End temperature: 150° C.
Increments: 10° C.

The specimen is sealed inside to inside at each sealbar temperature and seal strength (force) is determined at each step. The temperature is determined at which the seal strength reaches 5 N.

Tensile Modulus

Tensile Modulus in machine and transverse direction are determined according to ISO 527-3 at 23° C. on blown films of 50 μm thickness produced on a monolayer blown film line with a melt temperature of 220° C. and a chill roll temperature of 20° C. with a thickness of 50 μm produced as indicated below. Testing was performed at a cross head speed of 1 mm/min.

Dart-drop impact strength (DDI) is measured using ASTM D1709, method A (Alternative Testing Technique) from the film samples. A dart with a 38 mm diameter hemispherical head is dropped from a height of 0.66 m onto a film clamped over a hole. Successive sets of twenty specimens are tested. One weight is used for each set and the weight is increased (or decreased) from set to set by uniform increments. The weight resulting in failure of 50% of the specimens is calculated and reported.

Tear resistance (determined as Elmendorf tear (N)): Applies both for the measurement in machine direction (MD) and transverse direction (TD). The tear strength is measured using the ISO 6383/2 method. The force required to propagate tearing across a film sample is measured using a pendulum device. The pendulum swings under gravity through an arc, tearing the specimen from pre-cut slit. The film sample is fixed on one side by the pendulum and on the other side by a stationary clamp. The tear resistance is the force required to tear the specimen. The relative tear resistance (N/mm) is then calculated by dividing the tear resistance by the thickness of the film.

Optomechanical Ability (OMA)

Optomechnical ability (OMA) is understood as the ratio of mechanical (especially dart-drop strength (DDI) and tensile (MD)) behaviour, to optical performance, namely haze, wherein the mechanical properties are targeted to be as high as possible and the optical performance in the sense of haze is desired to be as low as possible.

The optomechanical ability (OMA) is determined according the formula given below:

$$OMA = \frac{\text{Tensile Modulus } (MD)[MPa] * DDI(g)}{\text{Haze } (50 \text{ μm})[\%]}$$

2. Examples

Preparation of the Catalyst for the Inventive TERHECOs

The catalyst used in the inventive examples is prepared as described in detail in WO 2015/011135 A1 (metallocene complex MC1 with methylaluminoxane (MAO) and borate resulting in Catalyst 3 described in WO 2015/011135 A1) with the proviso that the surfactant is 2,3,3,3-tetrafluoro-2-(1,1,2,2,3,3,3-heptafluoropropoxy)-1-propanol. The metallocene complex (MC1 in WO 2015/011135 A1) is prepared as described in WO 2013/007650 A1 (metallocene E2 in WO 2013/007650 A1).

Polymerization and Pelletization

Polymerization was performed in a Borstar pilot plant comprising a prepolymerization reactor, a loop reactor and two gas phase reactors. The polymerization conditions are indicated in Table 1. The resulting TERHECOs were compounded in a co-rotating twin-screw extruder Coperion ZSK 57 at 220° C. with 0.2 wt % of Irganox B225 (1:1-blend of Irganox 1010 (Pentaerythrityl-5 tetrakis(3-(3',5'-di-tert-.butyl-4-hydroxytoluyl)-propionate and tris(2,4-di-t-butylphenyl)phosphate)phosphite) of BASF AG, Germany) and 0.1 wt % calcium stearate followed by solidification of the resulting melt strands in a water bath and pelletization.

TABLE 1

Preparation of the inventive TERHECOs

| | | TERHECO-1 | TERHECO-2 | TERHECO-3 |
|---|---|---|---|---|
| Prepolymerization | | | | |
| Temperature | [° C.] | 20 | 20 | 20 |
| Catalyst feed | [g/h] | 1.3 | 0.9 | 0.9 |
| C3 feed | [kg/h] | 56.7 | 56.7 | 56.7 |
| H2 feed | [g/h] | 0.7 | 0.7 | 0.7 |
| Residence time | [h] | 0.4 | 0.4 | 0.4 |
| Loop | | | | |
| Temperature | [° C.] | 70 | 70 | 70 |
| Pressure | [kPa] | 5221 | 5237 | 5117 |
| H2/C3 ratio | [mol/kmol] | 0.1 | 0.1 | 0.1 |
| C6/C3 ratio | [mol/kmol] | 5.3 | 5.0 | 5.1 |
| C2/C3 ratio | [mol/kmol] | 0 | 8.1 | 8.1 |
| MFR$_2$ | [g/10 min] | 2.0 | 2.0 | 2.0 |
| XCS | [wt %] | 0.9 | 1.3 | 1.3 |
| C6 | [wt %] | 1.7 | 1.7 | 1.7 |
| C2 | [wt %] | 0.0 | 0.5 | 0.5 |
| Residence time | [h] | 0.6 | 0.6 | 0.6 |
| Split | [wt %] | 36 | 36 | 37 |
| GPR1 | | | | |
| Temperature | [° C.] | 75 | 75 | 75 |
| Pressure | [kPa] | 2400 | 2400 | 2400 |
| H2/C3 ratio | [mol/kmol] | 0.8 | 1.0 | 1.0 |
| C6/C3 ratio | [mol/kmol] | 10.1 | 9.2 | 8.9 |
| C2/C3 ratio | [mol/kmol] | 0 | 31.4 | 31.5 |
| C6 (GPR1) | [wt %] | 5.0 | 5.5 | 5.3 |
| C2 (GPR1) | [wt %] | 0.0 | 0.7 | 0.7 |
| MFR2 (GPR1) | [g/10 min] | 2.5 | 2.2 | 2.2 |
| Residence time | [h] | 2.8 | 2.5 | 2.4 |
| XCS | [wt %] | 14.0 | 19.3 | 19.0 |
| Split | [wt %] | 51 | 50 | 52 |
| GPR2 | | | | |
| Temperature | [° C.] | 65 | 65 | 65 |
| Pressure | [kPa] | 2450 | 2330 | 2290 |
| H2/C3 ratio | [mol/kmol] | 0.2 | 0.0 | 0.0 |
| C6/C3 ratio | [mol/kmol] | 0.0 | 0.0 | 0.0 |
| C2/C3 ratio | [mol/kmol] | 528 | 278 | 299 |
| Residence time | [h] | 1.2 | 1.1 | 1.1 |
| Split | [wt %] | 13 | 14 | 11 |

TABLE 2

Properties of the inventive TERHECOs

|  |  | TERHECO-1 | TERHECO-2 | TERHECO-3 |
|---|---|---|---|---|
| MFR | [g/10 min] | 2.1 | 1.9 | 1.9 |
| C2 (total) | [wt %] | 2.3 | 0.9 | 0.8 |
| C6 (total) | [wt %] | 4.4 | 4.7 | 4.7 |
| C2 (XCS) | [wt %] | 11.2 | 4.9 | 5.2 |
| C6 (XCS) | [wt %] | 1.5 | 4.1 | 3.8 |
| XCS | [wt %] | 22.2 | 14.8 | 13.5 |
| IV (XCS) | [dl/g] | 1.96 | 2.70 | 2.93 |
| XCI | [wt %] | 77.8 | 85.2 | 86.5 |
| C2 (XCI) | [wt %] | 0.0 | 0.3 | 0.2 |
| C6 (XCI) | [wt %] | 5.2 | 4.8 | 4.8 |
| Tm | [° C.] | 134 | 130 | 131 |
| Tc | [° C.] | 94 | 92 | 91 |
| G' (23° C.) | [MPa] | 234 | 287 | 259 |
| Tg1 | [° C.] | −1.8 | −2 | −2.4 |
| Tg2 | [° C.] | −22 | −19 | −20 |
| Flexural modulus | [MPa] | 415 | 550 | 551 |
| Charpy NIS 23° C. | [KJ/m$^2$] | 16,1 | 6,7 | 6.8 |
| Charpy NIS −20° C. | [KJ/m$^2$] | 1.9 | 1.8 | 1.8 |
| Haze (1 mm) | [%] | 17 | 25 | 25 |

The polymers used for the Comparative Examples were commercial C2C3-RAHECOs SA233CF and SC820CF (commercially available from Borealis AG, Austria). The properties can be seen in Table 3.

TABLE 3

Properties of the comparative C2C3-RAHECOs

|  |  | SA233CF | SC820F |
|---|---|---|---|
| MFR | [g/10 min] | 0.5 | 4.6 |
| C2 (total) | [wt %] | 10.2 | 8.3 |
| C2 (XCS) | [wt %] | 31.3 | 30.0 |
| XCS | [wt %] | 21.8 | 19.4 |
| IV (XCS) | [dl/g] | 2.7 | 1.6 |
| XCI | [wt %] | 78.2 | 80.6 |
| C2 (XCI) | [wt %] | 4.4 | 3.1 |
| Tm | [° C.] | 140 | 141 |
| Tc | [° C.] | 96 | 103 |
| G' (23° C.) | [MPa] | 351 | 359 |
| Tg1 | [° C.] | −3.2 | −6.3 |
| Tg2 | [° C.] | −47 | −58 |
| Flexural modulus | [MPa] | 514 | 576 |
| Charpy NIS 23° C. | [KJ/m$^2$] | 72 | 11.4 |
| Charpy NIS −20° C. | [KJ/m$^2$] | 2.0 | 1.1 |
| Haze (1 mm) | [%] | 75 | 60 |

Further TERHECOs used for the Comparative Examples CE3 to CE6) are the TERHECOs described in WO 2013/127758 (IE1-IE4).

In Table 4 their properties are shown.

TABLE 4

|  |  | CE3 | CE4 | CE5 | CE6 |
|---|---|---|---|---|---|
| MFR | g/10min | 17 | 15 | 15 | 12 |
| C2 (total) | wt % | 3.4 | 3.3 | 2.1 | 2.5 |
| C6 (total) | wt % | 3.3 | 3.4 | 4.2 | 3.1 |
| C2 (XCS) | wt % | 10.1 | 9.6 | 9.1 | 6.1 |
| C6 (XCS) | wt % | 0.2 | 1.1 | 1.4 | 1.4 |
| XCS | wt % | 34.1 | 34.1 | 22.9 | 40.4 |
| IV (XCS) | dl/g | 0.98 | 1.04 | 0.96 | 1.24 |
| XCI | wt % | 67.9 | 67.9 | 87.1 | 59.6 |
| C2 (XCI) | wt % | 0.0 | 0.2 | 2.7 | 1.1 |
| C6 (XCI) | wt % | 4.3 | 4.0 | 5.1 | 4.3 |
| Tm | ° C. | 134.5 | 135 | 133.8 | 148.7 |
| Tc | ° C. | 95.3 | 94.5 | 96.5 | 98.5 |
| G' (23° C.) | MPa | 199 | n.d. | 224 | 236 |
| Tg1 | ° C. | −4.0 | n.d. | −4.0 | −8.0 |
| Tg2 | ° C. | −34 | n.d. | −36 | — |
| Flexural modulus | MPa | 502 | 495 | 595 | 498 |
| Charpy NIS 23° C. | KJ/m$^2$ | 18.2 | 18.1 | 12.0 | 15.0 |
| Charpy NIS −20° C. | kJ/m$^2$ | 1.2 | 1.2 | 1.1 | 0.9 |
| Haze (1 mm) | % | 33 | 32 | 37 | 31 |

Film Production

All film properties were determined on monolayer blown films of 50 μm thickness produced on a Collin blown film line. This line has a screw diameter of 30 millimeters (mm), L/D of 30, a die diameter of 60 mm, a die gap of 1.5 mm and a duo-lip cooling ring. The film samples were produced at 190° C. with an average thickness of 50 μm, with a 2.5 blow-up ratio and an output rate of about 8 kilograms per hour (kg/h). Properties of the films can be seen in Table 5 and Table 6.

TABLE 5

Film properties of IE1-IE3 and CE1 and CE2

|  |  | IE1 | IE2 | IE3 | CE1 | CE2 |
|---|---|---|---|---|---|---|
| BF |  | TERHECO 1 | TERHECO 2 | TERHECO 3 | SA233CF | SC820CF |
| TM/MD | MPa | 450 | 564 | 582 | 576 | 569 |
| TM/TD | MPa | 475 | 566 | 585 | 574 | 545 |
| DDI | g | 517 | 201 | 222 | 127 | 203 |
| Tear/MD | N/mm | 17.4 | 11.1 | 12.4 | 8.3 | 6.3 |
| Tear/TD | N/mm | 215 | 41.5 | 43.1 | 26.6 | 12.7 |
| Haze | % | 2.1 | 2.0 | 2.3 | 28.0 | 3.9 |
| SIT | ° C. | 100 | 104 | 104 | 117 | 122 |
| Tm-SIT |  | 32 | 31 | 26 | 23 | 19 |
| OMA |  | 110786 | 56682 | 56176 | 2613 | 9005 |

TABLE 6

Film properties of CE3 to CE6

|  |  | CE3 | CE4 | CE5 | CE6 |
|---|---|---|---|---|---|
| TM/MD | MPa | 466 | 445 | 542 | 450 |
| TM/TD | MPa | 458 | 439 | 533 | 438 |
| DDI | g | 210 | 212 | 118 | 173 |
| Tear/MD | N/mm | n.d. | n.d. | n.d. | n.d. |
| Tear/TD | N/mm | n.d. | n.d. | n.d. | n.d. |
| Haze (50 μm) | % | 4.1 | 3.9 | 5.0 | 3.8 |
| SIT* | ° C. | 88 | 88 | 90 | 88 |
| SET* | ° C. | 116 | 118 | 118 | 132 |
| Tm-SIT | ° C. | 46.5 | 47 | 43.8 | 60.7 |
| OMA |  | 23868 | 24189 | 12791 | 20487 | n.d. not determined
*SIT and SET according to WO 2013/127758

From the above tables it can be clearly seen that the inventive blown films base on the specific heterophasic propylene copolymer (TERHECO), show an advantageous combination of low sealing initiation temperature (SIT), high tear resistance as wells as impact strength, and good optical properties, like low haze. Furthermore, such films have an improved overall performance, i.e. high OMA.

The invention claimed is:

1. A blown film comprising at least 95.0 wt % of a heterophasic propylene copolymer (TERHECO) comprising units derived from propylene, ethylene and 1-hexene, the TERHECO having:
   a) an amount of a xylene cold soluble (XCS) fraction determined according to ISO 16152 (25° C.) in the range from 5.0 to 40.0 wt %, based on the total weight of the TERHECO, wherein the xylene cold soluble (XCS) fraction
      (i) has an intrinsic viscosity (IV) determined according to DIN ISO 162/1 (in decalin at 135° C.) in the range from 1.6 to 3.1 dl/g and
      (ii) comprises comonomer units derived from ethylene in an amount from 2.0 to 20.0 wt %, based on the total weight of the xylene cold soluble (XCS) fraction, and comonomer units derived from 1-hexene in an amount from 1.0 to 20.0 wt %, based on the total weight of the xylene cold soluble (XCS) fraction,
   b) an amount of a xylene cold insoluble (XCI) fraction determined according to ISO 16152 (25° C.) in the range from 95.0 to 60.0 wt %, based on the total weight of the TERHECO, wherein the xylene cold insoluble (XCI) fraction comprises
      (i) comonomer units derived from ethylene in an amount from 0.0 to 5.0 wt %, based on the total weight of the xylene cold insoluble (XCI) fraction, and comonomer units derived from 1-hexene in an amount from 1.0 to 10.0 wt %, based on the total weight of the xylene cold insoluble (XCI) fraction,
   c) a total ethylene content, based on the weight of the heterophasic propylene copolymer (TERHECO), in the range of 0.1 to 10.0 wt %,
   d) a total 1-hexene content, based on the weight of the heterophasic propylene copolymer (TERHECO), in the range of 3.0 to 10.0 wt %,
   e) a melt flow rate MFR$_2$ (230° C./2.16 kg) measured according to ISO 1133 in the range from 0.5 to 4.0 g/10 min, and
   f) a melting temperature Tm measured by differential scanning calorimetry (DSC) in the range from 120° C. to 145° C.

2. The blown film according to claim 1, wherein the xylene cold insoluble (XCI) fraction of the heterophasic propylene copolymer (TERHECO) has comonomer units derived from ethylene in an amount from 0.0 to 4.0 wt %, and wherein the heterophasic propylene copolymer (TERHECO) has a melting temperature Tm measured by differential scanning calorimetry (DSC) in the range from 123 to 142° C., and a haze measured according to ASTM D1033 on a 1.0 mm thick plaque in the range of from 5.0 to 45.0%.

3. The blown film according to claim 1, wherein the TERHECO consists of units derived from propylene, ethylene and 1-hexene.

4. The blown film according to claim 1, the TERHECO comprising
   a matrix (M) being a crystalline propylene copolymer (PP) and
   an elastomeric propylene copolymer (EC) dispersed in said matrix (M), wherein the matrix (M) is
   a crystalline propylene copolymer (C3/C6-PP) consisting of units derived from propylene and 1-hexene, or
   a crystalline propylene terpolymer (C3/C2/C6) consisting of units derived from of propylene, ethylene and 1-hexene and
   said elastomeric propylene copolymer (EC) is a terpolymer (T) comprising units derived from propylene, ethylene and 1-hexene.

5. The blown film according to claim 1, wherein the TERHECO is prepared in the presence of a metallocene catalyst in a multi-stage process.

6. The blown film according to claim 1, wherein the blown film has an Elmendorf tear strength determined in accordance with ISO 6383/2 measured in machine direction (MD), in the range from at least 5.0 N/mm up to 25.0 N/mm, and measured in transverse direction (TD) in the range of from at least 30.0 N/mm up to 300.0 N/mm.

7. The blown film according to claim 1, wherein the blown film has a haze measured according to ASTM D1033 on a 50 μm blown film in the range of from 0.5 to 10.0%.

8. The blown film according to claim 1, wherein the blown film has a sealing initiation temperature (SIT) in the range of from 80° C. to below 115° C.

9. The blown film according to claim 1, wherein the difference between melting temperature Tm of the TERHECO and SIT, (Tm−SIT), is in the range of 20° C. to 40° C.

10. The blown film according to claim 1, wherein the blown film has
    a tensile modulus in machine direction and/or transverse direction as measured according to ISO 527-3 at 23° C. in the range from 200 to 700 MPa, and/or
    a dart-drop impact strength (DDI) determined according to ASTM D1709, method A on a 50 μm blown film of at least 150 g up to 800 g 800 g.

11. The blown film according to claim 1, wherein the film has an optomechanical ability (OMA) determined on a 50 μm blown film according the formula given below:

$$OMA = \frac{\text{Tensile Modulus } (MD)[MPa] * DDI(g)}{\text{Haze}(50 \text{ μm})[\%]}$$

of at least 30 000 [MPa*g/%] up to 170 000 [MPa*g/%], wherein the Tensile Modulus in machine direction is measured according to ISO 527-3 at 23° C. on 50 μm blown films, DDI is the dart-drop impact strength determined according to ASTM D1709, method A on a 50 μm blown film, and haze is measured according to ASTM D1033 on a 50 μm blown film.

12. The blown film according to claim 1, wherein the film is a monolayer film.

13. An article comprising a blown film according to claim 1.

14. The blown film according to claim 1, wherein the xylene cold soluble (XCS) fraction comprises comonomer units derived from ethylene in an amount from 4.0 to 14.0 wt %, based on the total weight of the xylene cold soluble (XCS) fraction.

15. The blown film according to claim 1, wherein the xylene cold soluble (XCS) fraction comprises comonomer units derived from 1-hexene in an amount from 1.5 to 4.5 wt %, based on the total weight of the xylene cold soluble (XCS) fraction.

16. The blown film according to claim 1, wherein the heterophasic propylene copolymer (TERHECO) has a total ethylene content, based on the weight of the heterophasic propylene copolymer (TERHECO), in the range of 0.5 to 3.0 wt %.

17. The blown film according to claim 1, wherein the heterophasic propylene copolymer (TERHECO) has a total 1-hexene content, based on the weight of the heterophasic propylene copolymer (TERHECO), in the range of 4.0 to 6.0 wt %.

18. The blown film according to claim 1, wherein the heterophasic propylene copolymer (TERHECO) has a total 1-hexene content, based on the weight of the heterophasic propylene copolymer (TERHECO), in the range of 4.0 to 5.0 wt %.

* * * * *